US011977842B2

United States Patent
Rossi et al.

(10) Patent No.: US 11,977,842 B2
(45) Date of Patent: May 7, 2024

(54) METHODS AND SYSTEMS FOR GENERATING MOBILE ENABLED EXTRACTION MODELS

(71) Applicant: INTUIT INC., Mountain View, CA (US)

(72) Inventors: Dominic Miguel Rossi, San Diego, CA (US); Hui Fang Lee, Mountain View, CA (US); Tharathorn Rimchala, San Francisco, CA (US)

(73) Assignee: INTUIT INC., Mountain View, CA (US)

( * ) Notice: Subject to any disclaimer, the term of this patent is extended or adjusted under 35 U.S.C. 154(b) by 403 days.

(21) Appl. No.: 17/246,277

(22) Filed: Apr. 30, 2021

(65) Prior Publication Data

US 2022/0350968 A1    Nov. 3, 2022

(51) Int. Cl.
*G06F 40/284* (2020.01)
*G06N 3/045* (2023.01)
*G06N 3/08* (2023.01)

(52) U.S. Cl.
CPC .......... *G06F 40/284* (2020.01); *G06N 3/045* (2023.01); *G06N 3/08* (2013.01)

(58) Field of Classification Search
CPC ....... G06F 40/284; G06F 40/30; G06N 3/045; G06N 3/08
See application file for complete search history.

(56) References Cited

U.S. PATENT DOCUMENTS

| | | | |
|---|---|---|---|
| 10,559,299 B1* | 2/2020 | Arel | G06N 7/01 |
| 11,461,415 B2* | 10/2022 | Lu | G06Q 30/0241 |
| 2022/0067274 A1* | 3/2022 | Wang | G06N 3/08 |
| 2023/0229912 A1* | 7/2023 | Zhang | G06N 3/08 |
| | | | 706/25 |

FOREIGN PATENT DOCUMENTS

WO    WO 2021/060899    4/2021

OTHER PUBLICATIONS

Liu et al., "Multi-Task Deep Neural Networks for Natural Language Understanding", arXiv:1901.11504v2 [cs.CL], May 30, 2019, 10 pages.

(Continued)

*Primary Examiner* — Daniel C Washburn
*Assistant Examiner* — Athar N Pasha
(74) *Attorney, Agent, or Firm* — DLA Piper LLP (US)

(57) ABSTRACT

A computing system generates a plurality of training data sets for generating the NLP model. The computing system trains a teacher network to extract and classify tokens from a document. The training includes a pre-training stage where the teacher network is trained to classify generic data in the plurality of training data sets and a fine-tuning stage where the teacher network is trained to classify targeted data in the plurality of training data sets. The computing system trains a student network to extract and classify tokens from a document by distilling knowledge learned by the teacher network during the fine-tuning stage from the teacher network to the student network. The computing system outputs the NLP model based on the training. The computing system causes the NLP model to be deployed in a remote computing environment.

20 Claims, 6 Drawing Sheets

(56) References Cited

OTHER PUBLICATIONS

Sanh et al., "DistilBERT, a distilled version of BERT: smaller, faster, cheaper and lighter", arXiv:1910.01108v4 [cs.CL], Mar. 1, 2020, 5 pages.
Sun et al., "MobileBERT: a Compact Task-Agnostic BERT for Resource-Limited Devices", arXiv:2004.02984v2 [cs.CL], Apr. 14, 2020, 13 pages.
Houlsby et al., "Parameter-Efficient Transfer Learning for NLP", arXiv:1902.00751v2 [cs.LG], Jun. 13, 2019, 13 pages.
Search Report dated Jun. 28, 2022 issued in International Application No. PCT/US2022/021703.
Written Opinion dated Jun. 28, 2022 issued in International Application No. PCT/US2022/021703.

* cited by examiner

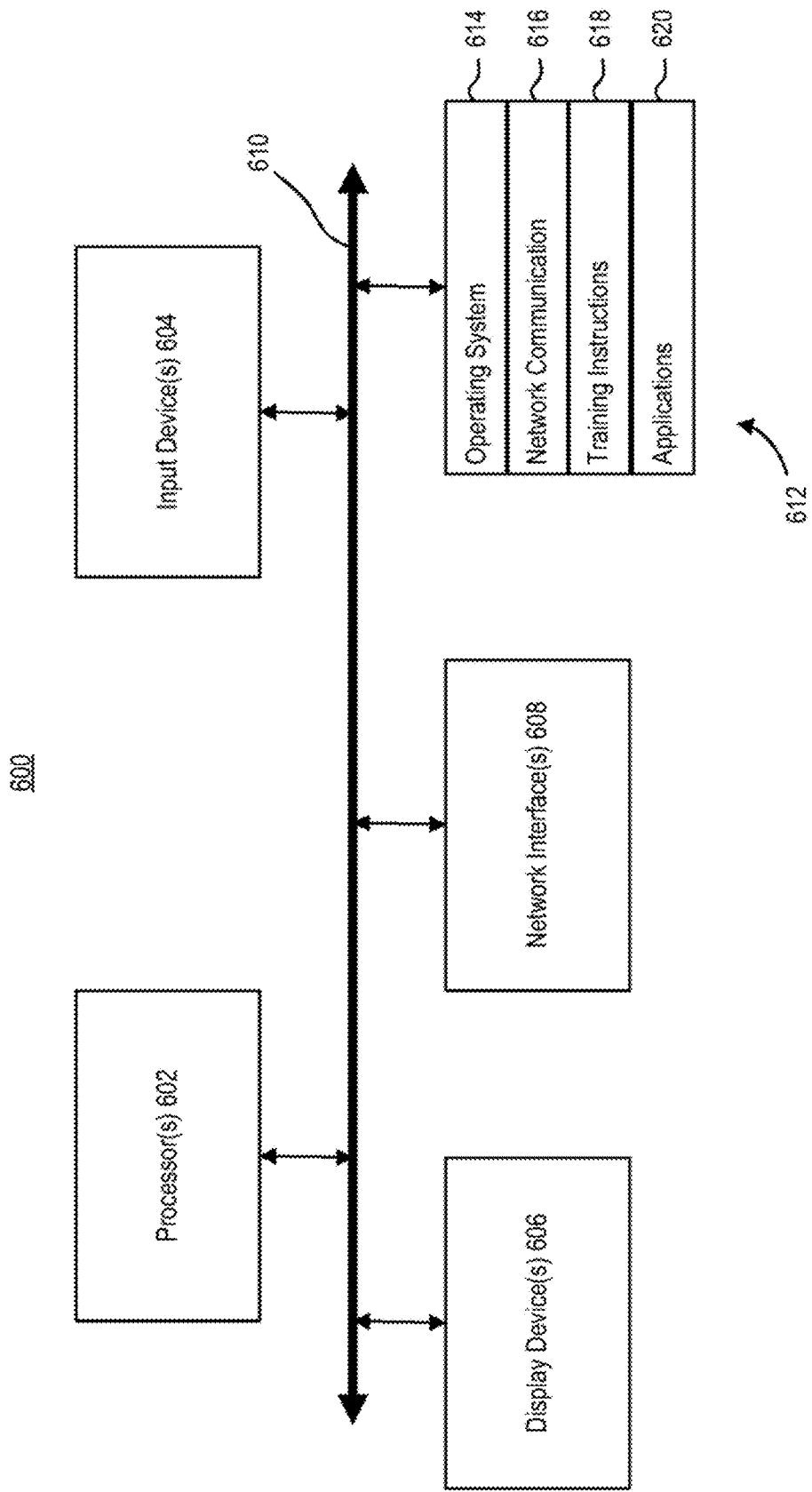

METHODS AND SYSTEMS FOR GENERATING MOBILE ENABLED EXTRACTION MODELS

BACKGROUND

Manually entering data from documents places a significant burden on users of software products. This process can be automated by software that securely and accurately extracts relevant information for documents for inclusion or auto-population into a plurality of input fields. High capacity modern natural language understanding models can be trained to automate the data extraction processed with high performance. However, these high capacity models often contain a large number of parameters and are typically both compute power and memory intensive and therefore do not translate well into mobile environments or other constrained computing environments.

BRIEF DESCRIPTION OF THE FIGURES

FIG. 6 is a block diagram illustrating an example computing device, according to various embodiments of the present disclosure.

DETAILED DESCRIPTION OF SEVERAL EMBODIMENTS

The described system generates a natural language processing (NLP) model that can be deployed in a remote computing environment. A computing system generates a plurality of training data sets for training the NLP models. The computing system trains a teacher network to classify and extract relevant information from a document. The training includes a pre-training stage where the teacher network is trained in an unsupervised manner to predict the next tokens on publicly available general natural language training data sets and a fine-tuning stage where the teacher network is trained in a supervised manner to classify tokens and extract relevant entities from in a domain specific targeted data sets. After the teacher training to convergence, the computing system trains a lightweight, more compact, mobile friendly student network with two objectives 1) classify tokens and extract entities from a document and 2) mimic the output distribution of the teacher network. This knowledge distillation process is done during the domain specific fine-tuning stage on downstream extraction tasks. The computing system outputs the trained lightweight student network based on the training. The computing system deploys the trained model in the remote computing environment, wherein the second computing system comprises fewer computing resources than the computing system training the NLP model.

Figure 1:
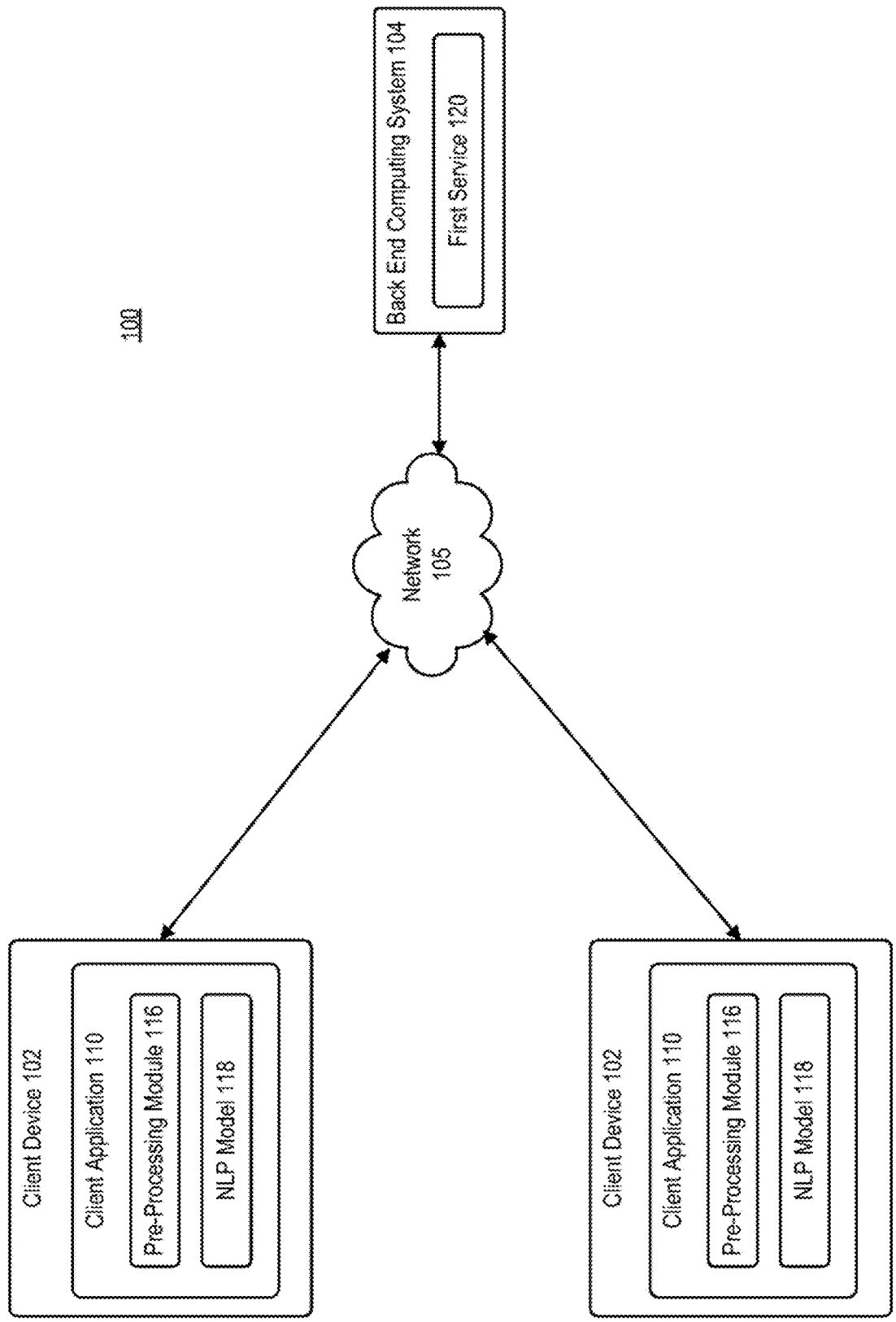
FIG. 1 shows an example computing environment configured to implement a natural language understanding process, according to various embodiments of the present disclosure.

FIG. 1 shows an example computing environment 100 configured to implement a natural language understanding process, according to embodiments of the present disclosure. Computing environment 100 may include one or more client devices 102 and a back-end computing system. One or more client devices 102 and back-end computing system 104 may be configured to communicate through network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 105 may be the Internet, a private data network, virtual private network using a public network and/or other suitable connection(s) that enables components in computing environment 100 to send and receive information between the components of computing environment 100.

In some embodiments, communication between the elements may be facilitated by one or more application programming interfaces (APIs). APIs of back-end computing system 104 may be proprietary and/or may be examples available to those of ordinary skill in the art such as Amazon® Web Services (AWS) APIs or the like Client device 102 may be operated by a user. Client device 102 may be representative of a mobile device, a tablet, a desktop computer, or any computing system having the capabilities described herein. Users may include, but are not limited to, individuals such as, for example, subscribers, clients, prospective clients, or customers of an entity associated with back-end computing system 104, such as individuals who have obtained, will obtain, or may obtain a product, service, or consultation from an entity associated with back-end computing system 104.

Client device 102 may include at least application 110. Application 110 may be representative of a stand-alone application associated with back-end computing system 104. Application 110 may prompt a user to input information for further processing by application 110. For example, client device 102 may generate a graphical user interface (GUI) associated with application 110. GUI may include one or more input fields that may prompt a user for input. In some embodiments, the input may correspond to an upload or image capture of one or more documents associated with an end user. For example, the input documents may contain financial documents, such as, but not limited to receipts, invoices W2 forms, and the like.

In some embodiments, rather than requiring a user to manually enter data from a physical or digital document into the plurality of input fields, application 110 may automatically process a digital copy of the document in order to extract the requisite data from those documents for auto-populating the plurality of input fields. In some embodiments, a user may upload a document to application 110 for further processing. In some embodiments, a user may capture an image of a physical document for upload to application 110. In either case, application 110 may be configured to process the information contained in the document in order to extract the necessary information and auto-populate the extracted data into respective input fields. To achieve this, application 110 may include a pre-processing module 116 and a trained natural language processing (NLP) model 118. Pre-processing module 116 may comprise one or more software modules. The one or more software modules may be collections of code or instructions stored on a media (e.g., memory of client device 102) that represent a series of machine instructions (e.g., program code) that implements one or more algorithmic steps. Such machine instructions may be the actual computer code the processor of client device 102 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Pre-processing module 116 may be configured to process uploaded documents or images of documents in order to convert that data into a format compatible with NLP model 118. For example, pre-processing module 116 may utilize one or more optical character recognition techniques to identify and isolate text contained in a given document. Based on the identified and isolated text, pre-processing module 116 may convert that data into a format compatible with NLP model 118. For example, pre-processing module 116 may convert that data into a sequence of textual tokens with bounding boxes and corresponding tensors for input to NLP model 118.

NLP model 118 may be configured to analyze inputs received from pre-processing module 116 and extract the requisite information for input into each of the plurality of input fields. As described in greater detail below, NLP model 118 may be a deep neural network that may be trained at back-end computing system 104 and deployed in the client environment.

Back-end computing system 104 may be configured to implement a first service 120, which may be used to train NLP model 118 for deployment in client device 102.

Client devices 102 and back-end computing system 104 are each depicted as single devices for ease of illustration, but those of ordinary skill in the art will appreciate that client devices 102 or back-end computing system 104 may be embodied in different forms for different implementations. For example, back-end computing system 104 may include a plurality of servers or one or more databases. Alternatively, the operations performed by the back-end computing system may be performed on fewer (e.g., one or two) servers. In some embodiments, a plurality of client devices 102 may communicate with back-end computing system 104. A single user may have multiple client devices 102, and/or there may be multiple users each having their own client device(s) 102.

Figure 2:
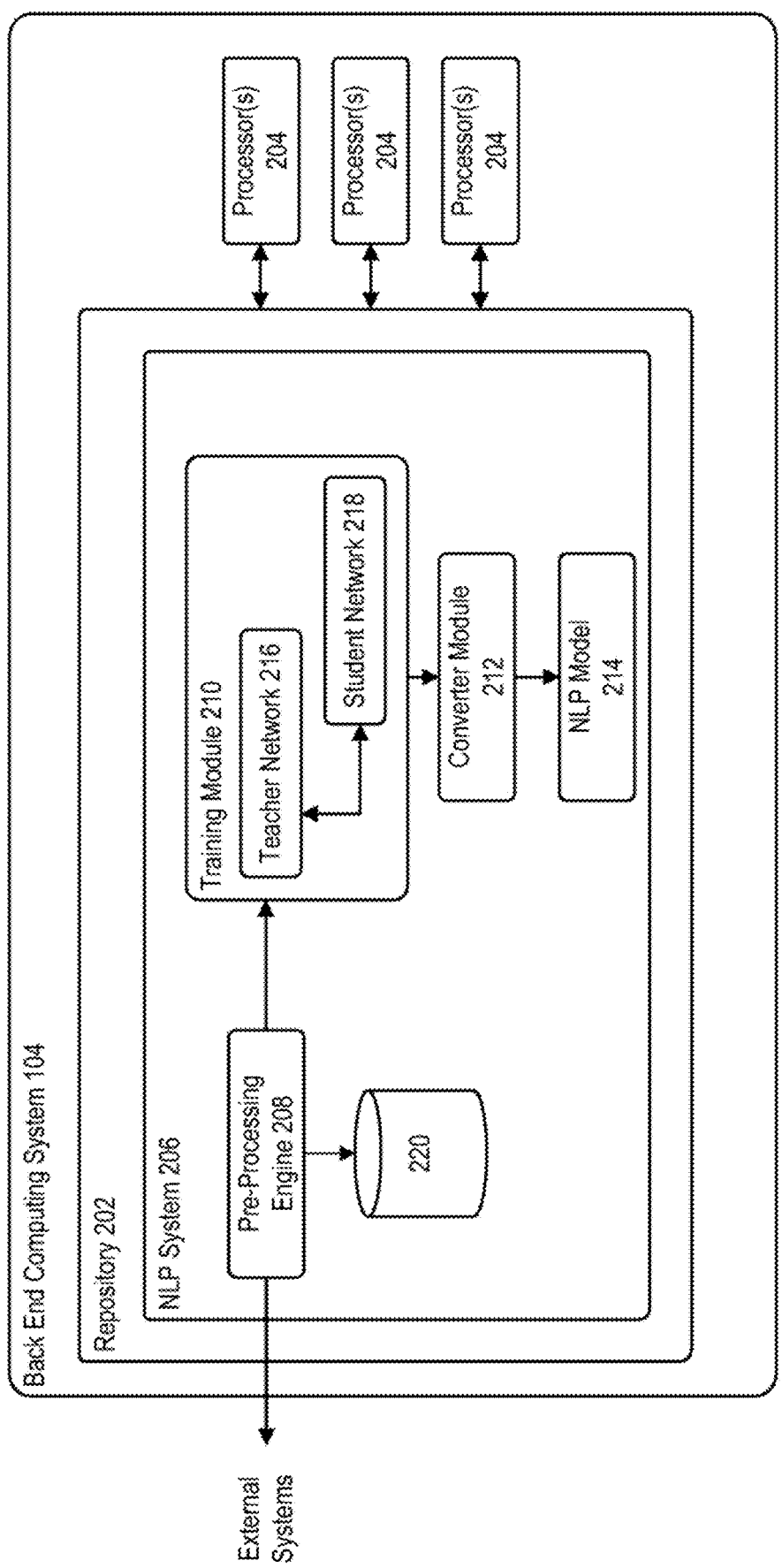
FIG. 2 is a block diagram illustrating back-end computing system, according various embodiments of the present disclosure.

FIG. 2 is a block diagram illustrating back-end computing system 104, according to one or more embodiments disclosed herein. As shown, back-end computing system 104 may include a repository 202 and one or more computer processors 204. In some embodiments, back-end computing system 104 may take the form of the computing device 600 described in FIG. 6 and the accompanying description below or takes the form of client device 102 described in FIG. 1. In one or more embodiments, one or more computer processors 204 may take the form of computer processor(s) 602 described in FIG. 6 and the accompanying description below.

In some embodiments, repository 202 may be any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. Repository 202 may include an NLP system 206.

NLP system 206 may be configured to train and deploy an NLP model on client devices 102. NLP system 206 may include a pre-processing engine 208, a training module 210, a converter module 212, and an NLP model 214. Each of pre-processing engine 208, training module 210, and converter module 212 may comprise one or more software modules. The one or more software modules may be collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Pre-processing engine 208 is configured to generate a plurality of training data sets for training module 210. Pre-processing engine 208 may generate a first plurality of training data sets and a second plurality of training data sets. The first plurality of training data sets may be generated using a large text corpus for unsupervised training of process. In some embodiments, pre-processing engine 208 may generate the first plurality of training data sets based on content stored in data store 220. In some embodiments, pre-processing engine 208 may generate the first plurality of training data sets on content associated with third party systems. For example, pre-processing engine 208 may generate the first plurality of training data sets based on publicly available data sets such as Wikipedia text.

The second plurality of training data sets may be derived from domain specific corpus of text. In some embodiments, the second plurality of training data sets may include data related to the target task for which training module 210 optimized NLP model 214. For example, the second plurality of training data may include, but is not limited to, financial documents, such as, but not limited to invoices, receipts, W2 forms, and the like. In some embodiments, pre-processing engine 208 may retrieve the financial documents from data store 220.

In some embodiments, pre-processing engine 208 may convert compound data fields in each form into a plurality of discrete data fields. For example, pre-processing engine 208 may convert a compound data field of "Name (first/middle/last)" to Name First/Name Middle/Name Last/Name Full. To highlight this further, "John H. Smith" would become "John," "H," "Smith," "John H. Smith".

Further, in some embodiments, to generate the second plurality of training data, pre-processing engine 208 may pre-process the data before providing the second training data sets to training module 210. For example, pre-processing engine 208 may convert the data from data store 220 into a sequence of textual tokens with bounding boxes and corresponding tensors for input to training module 210.

Training module 210 is configured to train NLP model 214. As described above, NLP approaches typically utilize pre-trained models with millions of parameters. Due to the large size and high latency of these NLP approaches, they cannot be deployed to resource-limited computing devices, such as, but not limited to, mobile devices, tablets, and some other computing devices. Because of this, developers typically need to develop a lightweight alternative to conventional NLP models that would otherwise be deployed on a server structure. To account for this, training module 210 may utilize a teacher-student paradigm to generate a mobile friendly NLP model (e.g., NLP model 214). For example, training module 210 may utilize a teacher-student training paradigm, by which training module 210 may start with a larger, higher capacity NLP model (e.g., teacher network 216) and utilize distillation techniques to distill the knowledge from teacher network 216 to a compact student model architecture (e.g., student network 218). In this manner, training module 210 may develop NLP model 214 that is close in accuracy to a high capacity model but is lightweight enough for deployment in a mobile environment.

As shown, training module 210 may include a teacher network 216 and a student network 218. Teacher network 216 may be representative of a high capacity NLP model. In some embodiments, teacher network 216 may be representative of a multi-task bidirectional encoder representations from transformers (BERT) model. Generally, BERT is a state-of-the-art NLP model that may be used on extraction tasks. BERT includes billions of parameters and typically requires on the order of gigabytes of memory to execute. Because of these memory requirements, it is challenging to deploy BERT on a mobile device, such as client device 102. The teacher-student paradigm helps training module 210 achieve a mobile friendly version BERT.

Training module 210 may train teacher network 216 to extract certain elements from documents uploaded by users. The training process may have two parts: a pre-training stage and a fine tuning stage.

During the pre-training stage, training module 210 may train teacher network 216, generally, on a training set generated by pre-processing engine 208. For example, training module 210 may train teacher network 216 using the first plurality of training data sets that were generated using a large text corpus of generic or wide ranging topics. In some embodiments, the pre-training stage may include a combination of masked language modeling and next sentence prediction.

Masked language modeling may include pre-processing engine 208 masking a percentage of tokens (e.g., words) in the first plurality of training data sets. Using a specific approach, for each token, pre-processing engine 208 may either (1) replace the token with a [MASK] token; (2) replace a token a random token (e.g., replace "car" with "dog"); or (3) keep the token unchanged. Accordingly, using the masked language modeling approach, training module 210 may train teacher network 216 to predict a word in a given token position given the context of words surrounding the token.

Next sentence prediction aids in training NLP model 214 to understand relationships between two sentences. For example, pre-processing engine 208 may use next sentence prediction to train teacher network 216 to predict the next sentence following an input sentence. To do so, pre-processing engine 208 may provide teacher network 216 with a two sentence (a first sentence and a second sentence). A portion of the time, the second sentence is the actual sentence that follows the first sentence; another portion of the time, the second sentence is a random sentence. Pre-processing engine 208 may be trained to determine if the second sentence indeed follows the first sentence. For example, the output form pre-processing engine 208 may be binary: 0 for false, 1 for true.

During the fine-tuning stage, training module 210 may fine-tune teacher network 216 to perform domain-specific tasks. To train teacher network 216 to perform domain-specific tasks across a variety of document types, training module 210 may fine-tune teacher network 216 on multiple data sets corresponding to multiple document types. For example, training module 210 may fine-tune teacher network 216 using the second plurality of training data sets. In some embodiments, teacher network 216 may be trained on the multiple data sets simultaneously. For example, teacher network 216 may be trained on a large data set that include data from 1098t forms, 1099r forms, W2 forms, and the like. In some embodiments, teacher network 216 may be trained on the multiple data sets separately. For example, teacher network 216 may be trained on a first data set corresponding to 1098t forms, a second data set corresponding to 1099r forms, a third data set corresponding to W2 forms, and the like.

In some embodiments, training module 210 may fine-tune teacher network 216 to extract certain elements from specific document types uploaded by users. For example, training module 210 may fine-tune teacher network 216 to extract certain elements from tax-specific documents, such as, but not limited to, W2 forms, 1098-T forms, 1099-R forms, and the like. To do so, training module 210 may implement a combination of masked language modeling and next sentence prediction using the fine-tuned data. In this manner, training module 210 may optimize or fine-tune teacher network 216 for specific downstream tasks related to financial document extraction.

Once teacher network 216 is trained to convergence, training module 210 may begin training of student network 218. To train student network 218, training module 210 may distill multi-task knowledge learned by teacher network 216 to student network 218. Knowledge distillation may broadly refer to the ability to train a student model to reproduce the behavior of the teacher model. In this manner, student network 218 may be trained to approximate the original function learned by teacher network 216.

In conventional systems, the teacher-student paradigm utilized two approaches for transferring knowledge learned from the teacher network down to the student network. For example, conventional systems utilized either a transfer learning approach or a distillation learning approach during the pre-training phase. For the transfer learning approach, these techniques involved sequential layer-wise knowledge distillation training, which typically requires the teacher and the student architectures to have the same number of layers as well as the same layer width. Because training module 210 utilizes knowledge distillation instead of layer-wise knowledge transfer, training module 210 allows for more flexible teacher-student architecture pairs and bypasses the need of an inverted bottleneck layer that would otherwise be required when utilizing BERT as a teacher network in the layer-wise knowledge transfer approach. Further, instead of applying knowledge training at the pre-training stage, training module 210 performs knowledge distillation at the fine-tuning stage. The benefit of performing knowledge distillation at the fine-tuning stage compared to the pre-training stage is a reduction in training time and floating point operations.

Training module 210 may train student network 218 using soft target probability generated by teacher network 216 during the fine-tuning stage. To enable knowledge distillation at the fine-tuning stage, training module 210 may implement a multitask distillation loss with the same weights on a cross entropy loss function as the one used during fine-tuning of teacher network 216. Generally, knowledge distillation is an iterative process by which information from teacher network 216 is transferred to student network 218. In some embodiments, the distillation process may begin at the same time training module 210 trains student network 218 on its new task. Such approach to knowledge distillation differs from traditional approaches, in which the distillation process is initiated prior to giving student network 218 a new task. The traditional approaches distill knowledge from the teacher network to the student model network, and then adapts the student network to a new task before finishing the fine tuning. In the current approach, training module 210 may give student network 218 its new task right away and then begin distillation from teacher network 216. Such approach removes a step from the traditional process.

Once student network 218 is trained to convergence, converter module 212 may convert the lower level teacher model into NLP model 214. For example, after the compact student model is trained to convergence, converter module 212 may further compress the student model using dynamic quantization. Dynamic quantization may reduce the size of student network 218, while maintain a high degree of model accuracy. In some embodiments, converter module 212 may utilize dynamic range quantization techniques to reduce the size of student network 218. In some embodiments, converter module 212 may utilize full integer quantization techniques to reduce the size of student network 218. In some embodiments, converter module 212 may utilize float quantization techniques to reduce the size of student network 218 Dynamic quantization reduces the size of weights of a model ahead of time and dynamically reduces the size of intermediate outputs as they pass through the network, when the model is being used. When models are trained, they are trained using floating point precision with usually at least 32 bits or precision per number. After training is completed and all of the model weights have been determined in the float32 space, they can be converted down into integers in an 8-bit space. When the model is used and data is passed into the model, intermediate products are created. Dynamic quantization allows for the intermediate products to be quantized down into the 8-bit space when these products are created. Without this, the inputs would need to be quantized down to 8 bits prior to entering the model, which would result in a loss of too much information. Quantizing it at the time data arrives means a maximum amount of information can be retained when moving from 32 to 8 bits, for each separate input. This means that quantization happens when a model is being used, for models that make use of dynamic quantization.

NLP model 214 may be representative of the output from converter module 212. For example, NLP model 214 may be a reduced sized version of student network 218 that may be deployed in one or more client devices 102.

Figure 3B:
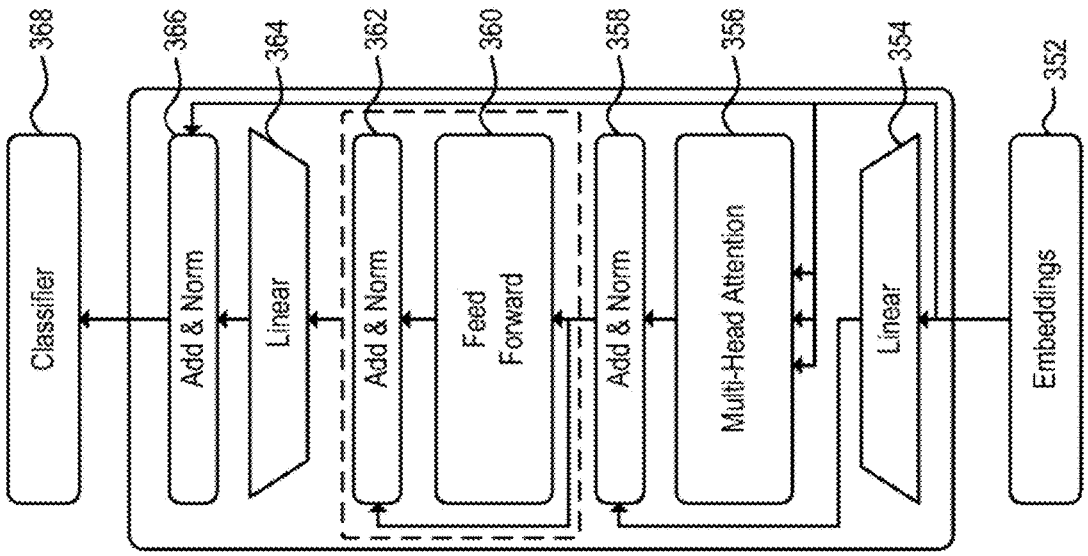
FIG. 3B is a block diagram illustrating student network, according to various embodiments of the present disclosure.
Figure 3A:
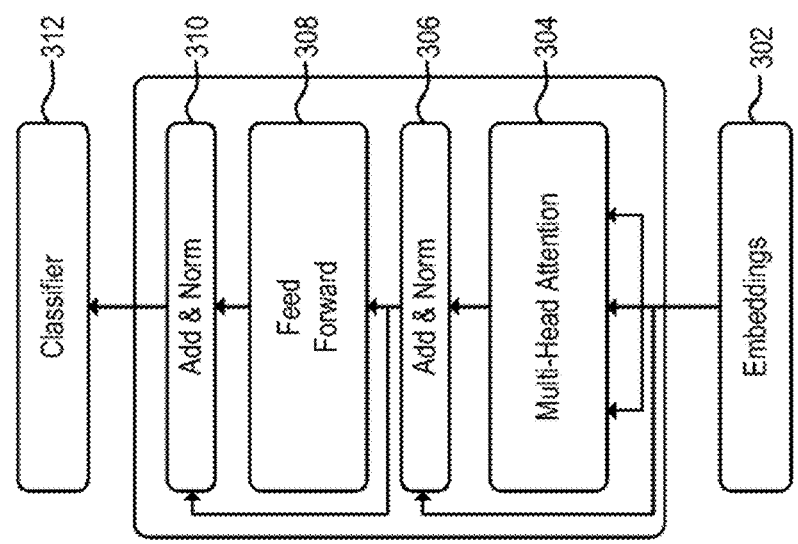
FIG. 3A is a block diagram illustrating teacher network, according to various embodiments of the present disclosure.

FIG. 3A is a block diagram illustrating teacher network 216, according to one or more embodiments disclosed herein. As described in FIG. 2, teacher network 216 may be representative of a multi-task BERT model, which is a state-of-the-art NLP model that may be used on extraction tasks. As shown, teacher network 216 may include an embedding layer 302. Embedding layer 302 may be representative of a numeric representation of words that may be provided to teacher network 216 as input. Embedding layer 302 may allow teacher network 216 to convert text received from pre-processing engine 208 to a numerical representation for further analysis. Embedding layer 302 may provide the word embeddings to multi-head attention layer 304, as input. Multi-head attention layer 304 may be representative of a transformer portion of the BERT model. For example, multi-head attention layer 304 may be configured to learn contextual relationships between words in a given text string. Output from multi-head attention layer 304 may be provided to add & norm layer 306. Add & norm layer 306 may correspond to two operations: the addition of a layer that may contain a residual structure and a normalization operation. Output from add & norm layer 306 may be provided to feed forward network 308 as input.

Feed forward network 308 may be configured to generate contextualized embeddings based on the input provided by add & norm layer 306. The output from feed forward network 308 may be provided, as input, to an additional add & norm layer 310. The output from add & norm layer 310 may be provided to a classification layer 312. Classification layer 312 may be configured to classify the contextualized embeddings generated by feed forward network 308. For example, classification layer 312 may be configured to classify each token provided to teacher network 216. <

FIG. 3B is a block diagram illustrating student network 218, according to one or more embodiments disclosed herein. As described above, student network 218 may be representative of a MobileBERT model. MobileBERT is a compressed and accelerated version of original BERT, which can be deployed in a mobile environment. Similar to original BERT, MobileBERT can be applied to various downstream tasks, such as, but not limited to, financial form data extraction. Conventionally, MobileBERT works exists within the context of a modified version of BERT—Inverted-Bottleneck (IB)-BERT. IB-BERT may act as a trained teacher model, for which knowledge transfer is initiated from IB-BERT to MobileBERT. The motivation behind using IB-BERT instead of original BERT is because of the constraints associated with sequential layerwise knowledge transfer. In particular, for sequential layerwise knowledge transfer, the teacher and the student architectures must have the same number of layers as well as the same layer width. Because training module 210 implements a knowledge distillation approach instead of a knowledge transfer approach, such architectural constraints are eliminated, and training module 210 may utilize the full power of original BERT.

As shown, student network 218 may include an embedding layer 352. Embedding layer 352 may be representative of a numeric representation of words that may be provided to student network 218 as input. Embedding layer 352 may allow student network 218 to convert text received from pre-processing engine 208 to a numerical representation for further analysis. However, as described above, because training module 210 utilizes a knowledge distillation approach, student network 218 may not be trained on the raw data directly. Instead, embedding layer 352 may further receive, as input, soft labels generated by teacher network 216 during the training process. Embedding layer 352 may provide the word embeddings and the soft labels to linear layer 354, as input.

Linear layer 354 may be representative of a linear transformation operation to be performed on the inputs provided by embedding layer 352. For example, linear layer 354 may adjust the input data to a lower dimensional form for input to multi-head attention layer 356. Multi-head attention layer 356 may be representative of a transformer portion of the MobileBERT model. For example, multi-head attention layer 356 may be configured to learn contextual relationships between words in a given text string. Output from multi-head attention layer 356 may be provided to add & norm layer 358. Add & norm layer 358 may correspond to two operations: the addition of a layer that may contain a residual structure and a normalization operation. Output from add & norm layer 358 may be provided to feed forward network 360 as input.

Feed forward network 360 may be configured to generate contextualized embeddings based on the input provided by add & norm layer 358. The output from feed forward network 360 may be provided, as input, to an additional add & norm layer 362. The output from add & norm layer 362 may be provided to another linear layer 364. Linear layer 364 may perform an opposite transformation, compared to linear layer 354. For example, linear layer 364 may adjust the input data back to a higher dimensional form for input to an additional add & norm layer 366. The output from add & norm layer 366 may be provided to a classification layer 368. Classification layer 368 may be configured to classify the contextualized embeddings generated by feed forward network 360. In this manner, student network 218 may be trained to mimic the output generated by teacher network 216.

Figure 4:
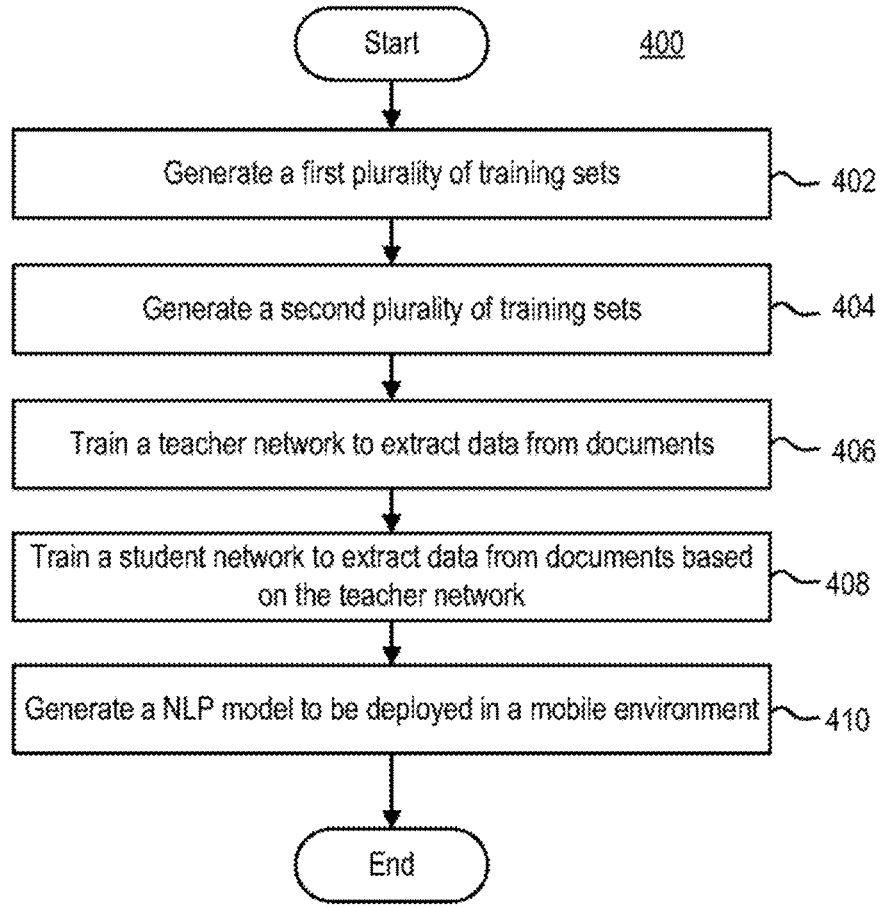
FIG. 4 is a flow diagram illustrating a method of generating an NLP model to be deployed in a mobile environment, according to various embodiments of the present disclosure.

FIG. 4 is a flow diagram illustrating a method 400 of generating an NLP model to be deployed in a mobile environment, according to one or more embodiments. Method 400 may begin at step 402.

At step 402, NLP system 206 may generate a first plurality of training sets for generating an NLP model 214. For example, pre-processing engine 208 may generate a first plurality of training data sets for a pre-training process. The first plurality of training data sets may be generated using a large text corpus for a general training process. In some embodiments, pre-processing engine 208 may generate the first plurality of training data sets based on content stored in data store 220. In some embodiments, pre-processing engine 208 may generate the first plurality of training data sets on content associated with third party systems. For example, pre-processing engine 208 may generate the first plurality of training data sets based on content scraped or gathered from third party web pages, such as, but not limited to Wikipedia. In some embodiments, to generate the first plurality of training data, pre-processing engine 208 may pre-process the data before providing the first plurality training data sets to training module 210. For example, pre-processing engine 208 may convert the data from data store 220 and/or third party systems into a csv format.

At step 404, NLP system 206 may generate a second plurality of training data sets. For example, pre-processing engine 208 may generate the second plurality of training data sets for a fine-tuning process. The second plurality of training data sets may be generated using a more focused corpus of text. In some embodiments, the second plurality of training data sets may include data related to the target task for which training module 210 is optimizing NLP model 214. For example, the second plurality of training data may include, but is not limited to, financial forms, such as, but not limited to, 1098t forms, 1099r forms, W2 forms, and the like. In some embodiments, pre-processing engine 208 may retrieve the financial forms from data store 220. In some embodiments, pre-processing engine 208 may remove any identifying information from the financial forms. In some embodiments, pre-processing engine 208 may convert compound data fields in each form into a plurality of discrete data fields. Further, in some embodiments, pre-processing engine 208 may pre-process the data before providing the second training data sets to training module 210. For example, pre-processing engine 208 may convert the data from data store 220 into a csv format for input to training module 210.

At step 406, NLP system 206 may train a teacher network 216 to extract data from documents. The training process may have two parts: a pre-training stage and a fine-tuning stage. During the pre-training stage, training module 210 may train teacher network 216, generally, on the first plurality of training data sets generated by pre-processing engine 208. During the fine-tuning stage, training module 210 may fine-tune teacher network 216 to perform domain-specific tasks, such as data extraction from documents. To train teacher network 216 to perform domain-specific tasks across a variety of document types, training module 210 may fine-tune teacher network 216 on the second plurality of training data sets generated by pre-processing engine 208. In some embodiments, teacher network 216 may be trained on each of the second plurality of training data sets simultaneously. For example, teacher network 216 may be trained on a large data set that include data from 1098t forms, 1099r forms, W2 forms, and the like. In some embodiments, teacher network 216 may be trained on the second plurality of training data sets separately. For example, teacher network 216 may be trained on a first data set corresponding to 1098t forms, a second data set corresponding to 1099r forms, a third data set corresponding to W2 forms, and the like.

At step 408, NLP system 206 may train a student network 218 to extract data from documents based on outputs generated from teacher network 216. For example, once teacher network 216 is trained to convergence, training module 210 may begin training of student network 218. To train student network 218, training module 210 may distill multi-task knowledge learned by teacher network 216 to student network 218. In this manner, student network 218 may be trained to approximate the original function learned by teacher network 216. Training module 210 may train student network 218 using soft target probability generated by teacher network 216 during the fine-tuning stage. To enable knowledge distillation at the fine-tuning stage, training module 210 may implement a multitask distillation loss with the same weights on a cross entropy loss function as the one used during fine-tuning of teacher network 216.

At step 410, NLP system 206 may generate NLP model 214 to be deployed in a mobile environment. For example, once student network 218 is trained to convergence, converter module 212 may convert the lower level teacher model into NLP model 214 using dynamic quantization. Dynamic quantization may reduce the size of student network 218, while maintaining a high degree of model accuracy. In some embodiments, converter module 212 may utilize dynamic range quantization techniques to reduce the size of student network 218. In some embodiments, converter module 212 may utilize full integer quantization techniques to reduce the size of student network 218. In some embodiments, converter module 212 may utilize float quantization techniques to reduce the size of student network 218.

Figure 5:
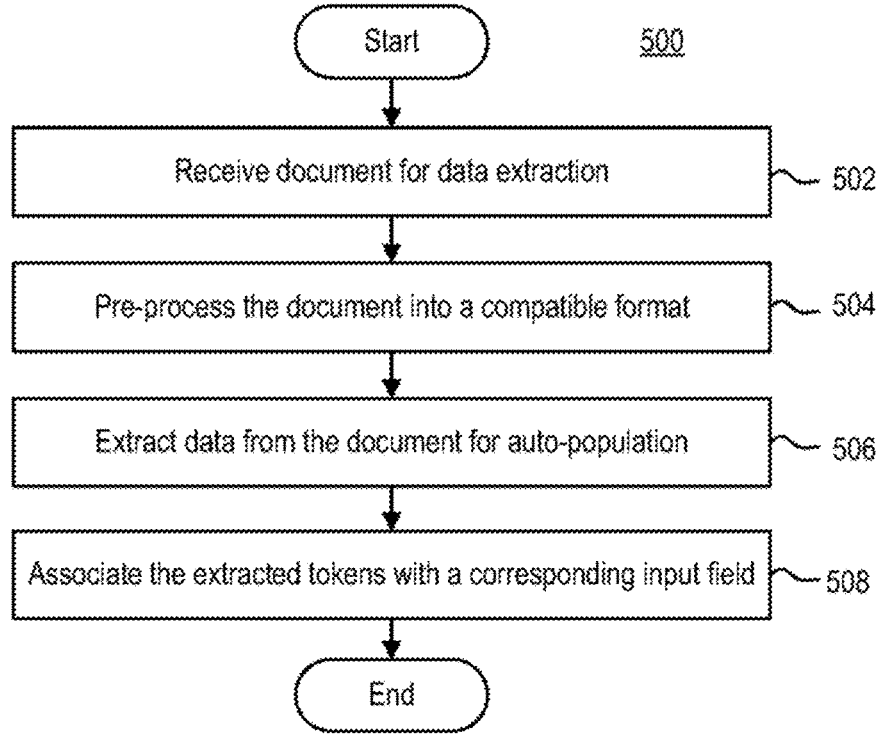
FIG. 5 is a flow diagram illustrating a method of extracting data from documents, according to various embodiments of the present disclosure.

FIG. 5 is a flow diagram illustrating a method 500 of extracting data from documents, according to example embodiments. Method 500 may begin at step 502.

At step 502, client device 102 may receive a document for data extraction. In some embodiments, client device 102 may receive the document via an upload option provided by application 110. For example, a user can navigate to a local or external file system for uploading a digital version of a document to application 110. In another example, a user may be able to capture an image of a physical document using a camera associated with client device 102. For example, a user may grant application 110 permission to access a camera associated with client device 102, and using the camera, the user may provide application 110 with an image of the physical document.

At step 504, client device 102 may pre-process the document into a format compatible with NLP model 118. For example, pre-processing module 116 may utilize one or more optical character recognition techniques to identify and isolate text contained in a given document. Based on the identified and isolated text, pre-processing module 116 may convert that data into a format compatible with NLP model 118. For example, pre-processing module 116 may convert that data into a CSV form for input to NLP model 118.

At step 506, client device 102 may extract data from the document for auto-population into a plurality of input fields. For example, pre-processing module 116 may provide the data associated with the document to NLP model 118 as input. NLP model 118 may be configured to extract and classify tokens contained in the input. The classification for each token may instruct application 110 regarding which token corresponds to which input field. In some embodiments, the output may be form dependent. For example, NLP model 118 may be used to extract all fields of a 1098-T. The fields of a 1098-T will not be the same fields as those present in a W2. Accordingly, the output of NLP model 118 is such that downstream processes may be able to associate text with various different boxes on forms.

At step 508, client device 102 may associate the extracted tokens with a corresponding input field. For example, using the classification generated by NLP model 118 for each token, application 110 may map each extracted token to a respective input field of the plurality of input fields. In this manner, application 110 is able to automatically process documents uploaded by a user without requiring the user to manually input the data into a plurality of input fields.

FIG. 6 shows an example computing device according to an embodiment of the present disclosure. For example, computing device 600 may function as back-end computing system 104. The computing device 600 may include a NLP system that executes the training process described above or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 612 may include various instructions for implementing an operating system 614 (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Training instructions 618 may include instructions that enable computing device 600 to function as an NLP system and/or to train an NLP model for deployment in a mobile environment. Application(s) 620 may be an application that uses or implements the processes described herein and/or other processes. The processes may also be implemented in operating system 614. For example, application 620 and/or operating system 614 train an NLP model capable of being deployed in a mobile environment.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of generating a natural language processing (NLP) model, the method comprising:
    generating, by a first computing system, a plurality of training data sets for generating the NLP model;
    training, by the first computing system, a teacher network to extract and classify tokens from a document, wherein the training comprises a pre-training stage where the teacher network is trained to classify generic data in the plurality of training data sets and a fine-tuning stage where the teacher network is trained to classify targeted data in the plurality of training data sets;
    training, by the first computing system, a student network to extract and classify tokens from a document by distilling knowledge learned by the teacher network during the fine-tuning stage from the teacher network to the student network, wherein distilling knowledge comprises implementing a distillation loss using weights that are the same;
    outputting, by the first computing system, the NLP model based on the training of the student network; and
    causing, by the first computing system, the NLP model to be deployed in a second computing system, wherein the second computing system comprises fewer computing resources than the first computing system.

2. The computer implemented method of claim 1, wherein the teacher network is a bidirectional encoder representations for transformer (BERT) model and wherein the student network is a MobileBERT model.

3. The computer implemented method of claim 1, wherein generating, by the first computing system, the plurality of training data sets for generating the NLP model, comprises:
    generating a first plurality of training data sets using a text corpus for a generic training process; and
    generating a second plurality of training data sets using targeted data for which NLP model is optimized.

4. The computer implemented method of claim 1, wherein training, by the first computing system, the student network to extract and classify tokens from a document by distilling knowledge learned by the teacher network during the fine-tuning stage from the teacher network to the student network comprises:
    training the student network to approximate an original function learned by the teacher network during training of the teacher network.

5. The computer implemented method of claim 1, wherein training, by the first computing system, the student network to extract and classify tokens from a document by distilling knowledge learned by the teacher network during the fine-tuning stage from the teacher network to the student network comprises:

classifying tokens for subsequent mapping of tokens to one or more of a plurality of input data fields.

6. The computer implemented method of claim 1, wherein training, by the first computing system, a student network to extract and classify tokens from a document by distilling knowledge learned by the teacher network during the fine-tuning stage from the teacher network to the student network comprises:
    inputting soft labels generated by the teacher network during training of the teacher network into the student network.

7. The computer implemented method of claim 1, wherein outputting, by the first computing system, the NLP model based on the training, comprises:
    compressing a trained student model into the NLP model using dynamic quantization.

8. A non-transitory computer readable medium having one or more sequences of instructions, which, when executed by a processor, causes a computing system to perform operations comprising:
    generating, by the computing system, a plurality of training data sets for generating an NLP model;
    training, by the computing system, a teacher network to extract and classify tokens from a document, wherein the training comprises a pre-training stage where the teacher network is trained to classify generic data in the plurality of training data sets and a fine-tuning stage where the teacher network is trained to classify targeted data in the plurality of training data sets;
    training, by the computing system, a student network to extract and classify tokens from a document by distilling knowledge learned by the teacher network during the fine-tuning stage from the teacher network to the student network, wherein distilling knowledge comprises implementing a distillation loss using weights that are the same;
    outputting, by the computing system, the NLP model based on the training of the student network; and
    causing, by the computing system, the NLP model to be deployed in a second computing system, wherein the second computing system comprises fewer computing resources than the computing system.

9. The non-transitory computer readable medium of claim 8, wherein the teacher network is a bidirectional encoder representations for transformer (BERT) model and wherein the student network is a MobileBERT model.

10. The non-transitory computer readable medium of claim 8, wherein generating, by first computing system, the plurality of training data sets for generating the NLP model, comprises:
    generating a first plurality of training data sets using a text corpus for a generic training process; and
    generating a second plurality of training data sets using targeted data for which NLP model is optimized.

11. The non-transitory computer readable medium of claim 8, wherein training, by the computing system, the student network to extract and classify tokens from a document by distilling knowledge learned by the teacher network during the fine-tuning stage from the teacher network to the student network comprises:
    training the student network to approximate an original function learned by the teacher network during training of the teacher network.

12. The non-transitory computer readable medium of claim 8, wherein training, by the computing system, the student network to extract and classify tokens from a document by distilling knowledge learned by the teacher network during the fine-tuning stage from the teacher network to the student network comprises:
    classifying tokens for subsequent mapping of tokens to one or more of a plurality of input data fields.

13. The non-transitory computer readable medium of claim 8, wherein training, by the computing system, a student network to extract and classify tokens from a document by distilling knowledge learned by the teacher network during the fine-tuning stage from the teacher network to the student network comprises:
    inputting soft labels generated by the teacher network during training of the teacher network into the student network.

14. The non-transitory computer readable medium of claim 8, wherein outputting, by the computing system, the NLP model based on the training, comprises:
    compressing a trained student model into the NLP model using dynamic quantization.

15. A system comprising:
    a processor; and
    a memory having one or more instructions stored thereon, which, when executed by the processor, causes the system to perform operations comprising:
        generating a plurality of training data sets for generating an NLP model;
        training a teacher network to extract and classify tokens from a document, wherein the training comprises a pre-training stage where the teacher network is trained to classify generic data in the plurality of training data sets and a fine-tuning stage where the teacher network is trained to classify targeted data in the plurality of training data sets;
        training a student network to extract and classify tokens from a document by distilling knowledge learned by the teacher network during the fine-tuning stage from the teacher network to the student network, wherein distilling knowledge comprises implementing a distillation loss using weights that are the same;
        outputting the NLP model based on the training of the student network; and
        causing the NLP model to be deployed in a remote computing system.

16. The system of claim 15, wherein the teacher network is a bidirectional encoder representations for transformer (BERT) model and wherein the student network is a MobileBERT model.

17. The system of claim 15, wherein generating the plurality of training data sets for generating the NLP model, comprises:
    generating a first plurality of training data sets using a text corpus for a generic training process; and
    generating a second plurality of training data sets using targeted data for which NLP model is optimized.

18. The system of claim 15, wherein training the student network to extract and classify tokens from a document by distilling knowledge learned by the teacher network during the fine-tuning stage from the teacher network to the student network comprises:
    training the student network to approximate an original function learned by the teacher network during training of the teacher network.

19. The system of claim 15, wherein training the student network to extract and classify tokens from a document by distilling knowledge learned by the teacher network during the fine-tuning stage from the teacher network to the student network comprises:

classifying tokens for subsequent mapping of tokens to one or more of a plurality of input data fields.

20. The system of claim 15, wherein training a student network to extract and classify tokens from a document by distilling knowledge learned by the teacher network during the fine-tuning stage from the teacher network to the student network comprises:
   inputting soft labels generated by the teacher network during training of the teacher network into the student network.

* * * * *